May 15, 1928.  
O. J. ANDERSON  
AUTOMOBILE SIGNAL  
Filed April 9, 1927
1,669,848
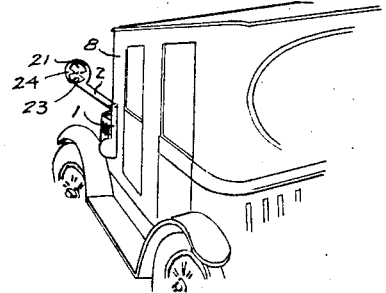
Fig. 1.
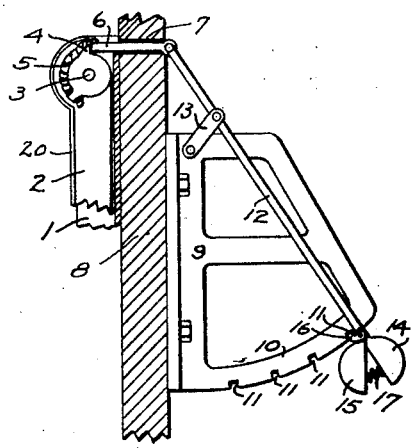
Fig. 2.
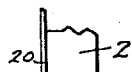
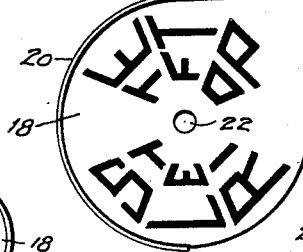
Fig. 3.
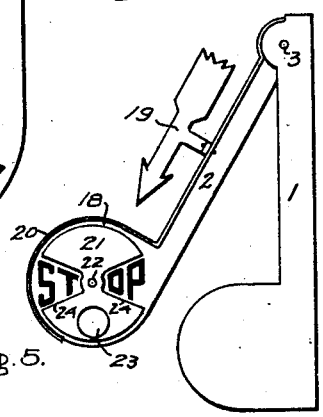
Fig. 5.
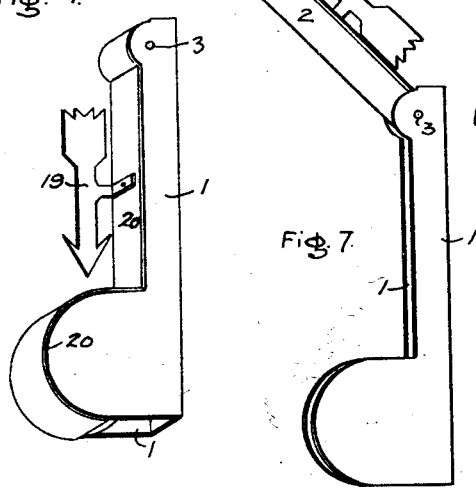
Fig. 4.
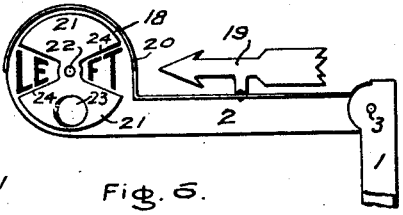
Fig. 6.
Fig. 7.
Inventor  
Oswald J. Anderson  
By  
Attorney Patented May 15, 1928.

1,669,848

UNITED STATES PATENT OFFICE.

OSWALD J. ANDERSON, OF TACOMA, WASHINGTON.

AUTOMOBILE SIGNAL.

Application filed April 9, 1927. Serial No. 182,266.

This invention relates to devices for indicating the direction in which an automobile is about to make a turn and has for its objects to provide such a device which will occupy any one of three standard indicating positions when in use; which will be completely enclosed when not in use; which is held positively against unintentional swinging when not in use; and which will automatically expose the correct printed word to indicate whether the machine is about to stop or to turn to the right or to the left.

I attain these and other objects by the devices, mechanisms, and arrangements illustrated in the accompanying drawing in which Fig. 1 is a perspective view of an automobile equipped with my improved signal, showing the signal in the position indicating a turn to the right; Fig. 2 is a section of the side of the car and of a part of the signal arm, showing the signal in inoperative position, and showing the operating and locking mechanism; Fig. 3 is an elevation of the end of the signal arm with the disk removed therefrom and showing the indicating words applied thereto; Fig. 4 is a perspective view of my improved automobile signal showing it in inoperative position; Figs. 5, 6, and 7 are elevations of my improved signal showing it in "stop" "left-" and "right-" turn positions, respectively.

Similar numerals of reference refer to similar parts throughout the several views.

This invention belongs to that class of automobile signals in which an arm is pivoted to the side of the car and is adapted to be swung out therefrom into one of three indicating positions. When such an arm is operated by means of a flexible connection with some actuating lever on the instrument board or on the steering post of the car, it is difficult to provide any means of holding it tight against the side of the car when in its inoperative position without materially increasing the force needed to operate the signal arm. In my device, however, I provide a positive connection between the operating lever and the indicating arm and confine its motion in such a manner that the operating lever holds the indicating arm in its inoperative position.

Although the signal is ordinarily conveyed by means of the position of the signal arm it is found that this method of signaling is not fully understood and I have therefore devised an automatic means whereby one of the words "Stop" "Left" or "Right" is exposed to view when the signal arm indicates the corresponding signal.

Referring now to the drawings it will be seen that the container 1 is secured to the side of the car in vertical position at any convenient point. This container comprises two side plates between which the signal arm is mounted and which are shaped to completely cover the sides of the signal arm when it is in inoperative position.

The signal arm 2 is secured by a horizontal pivot 3 to the upper end of the said container 1. The upper end of the arm 2 is circular around the pivot 3 and is provided with a tooth 4 extending upward therefrom. A cable or chain 5 lies on the said circular upper end of the arm 2 and is secured at its outer end thereto, said chain passing over the said tooth 4. The inner end of said chain 5 is secured, at the said tooth 4, to an operating rod 6 whose outer end is adapted to engage the said tooth 4 when the arm 2 is in inoperative position. This rod 6 passes through a straight opening 7, in the side 8 of the car, and is permitted a longitudinal motion alone therein, being held from any lateral motion by the said opening 7.

The operating mechanism comprises a frame 9 secured to the inner side of the car frame 8 immediately adjacent to the said rod 6. This frame 9 is provided with an end member 10 in which a series of four notches 11 are made. An operating lever 12 is secured at its upper end to the inner end of the said rod 6 and is attached at a point between its ends by means of a link 13 to the said frame 9. This operating lever 12 is provided with a sectional handle knob 14 at its end. A complementary sectional knob 15, is pivotally mounted on the said lever 12 adjacent to the said handle knob 14 and is provided with a lug 16 adapted to enter any one of the notches 11 in the end member 10 of the frame 9. A spring 17 is mounted between the two sectional knobs 14 and 15 and normally separates them, thereby causing the said lug 16 to enter the notch 11. By grasping both of the sectional knobs 14 and 15 and compressing the spring 17 the lug 16 is removed from the notch 11 and the lever 12 is then free to be moved to operate the signal.

The position of the first notch 11 is such that when the lug 16 engages therein the end of the rod 6 is in tight and forcible engagement with the tooth 4 on the arm 2 and therefore the said arm is securely held in its inoperative position. As the lever 12 is moved to bring the lug 16 into engagement with the next notch it draws the rod 6 away from the tooth 4, and the chain 5 then raises the signal arm 2 to its first or "stop" position; on further movement of the lever 12 the signal arm is raised to its second or horizontal position indicating a "left" turn; and a further motion of the lever 12, to engage the last notch, raises the signal arm to enter its highest position indicating a "right" turn.

The signal arm 2 may be of any desired form but the preferred form is that illustrated in the drawings comprising a main portion ending in a circular enlargement 18, and having an arrow-shaped figure 19 thereon. A plate 20 is secured to the outer edge of the signal arm 2 and extends part way round the circular end 18, said plate 20 fitting over the sides of the container 1 when the said arm is in its inoperative position.

In order to indicate the exact meaning of the positions of the signal arm 2 a circular disk 21 is mounted on a pivot 22 in the center of the said circular enlargement 18. A weight 23 is secured near the edge of the said disk 21 and causes said disk to rotate about the pivot 22 as the signal arm 2 rotates about the pivot 3 so that the said weight 23 always occupies the lowest point of the said disk 21. The disk 21 is provided with two slots 24 leading radially inward from opposite points of the outer edge and positioned so that their central axis always lies horizontal. The circular enlargement 18 is provided with suitable lettering arranged radially about the central pivot 22 and comprising the three words "Stop" "Left" "Right". The radial axes of each of said words is horizontal when the said signal arm 2 moves into the signal position corresponding with the word. Therefore the disk 21 hides the lettering of the words whose axes are not horizontal in any said position and the slots 24 in the said disk 21 expose the lettering of the word whose axis is horizontal in the corresponding position; that is to say when the arm is swung slightly outward from its inoperative position the word "Stop" is exposed to view through the slots 24 in the disk 21 but the other two words are hidden thereby; and when the arm is moved into its horizontal position, the word "Left" is exposed by the said slots and the other two words are hidden; and, when the arm is in its uppermost position the word "Right" is exposed to view and the other words are hidden.

Thus it will be seen that my improved automobile signal, when not in use, is enclosed within a fixed container and is protected thereby from damage and the weather, and that it is firmly held in this inoperative position by the pressure of the rod 6 on the tooth 4 and will neither rattle nor inadvertently swing outward, to the confusion of traffic. And that when it is swung outward into any one of its three indicating positions, the position of the arm corresponds with standard signaling and the exposed word on the end of the arm indicates the meaning of the signal.

It is of course understood that many variations in the design and construction of this device can be made without departing from the general idea of my invention and it is to be understood that such of these variations as fall within the meaning of the appended claim are covered thereby.

Having therefore described my invention what I claim is:

In an automobile signal, a signal arm pivoted to the side of an automobile and adapted to be swung out therefrom into any one of a plurality of signaling positions; a pivot pin mounted near the end of said arm; a disk loosely mounted on said pivot pin and having an opening therein; a weight mounted on said disk whereby said disk is automatically turned on said pivot pin as said pivot pin is revolved about the pivot of the signal arm, and whereby the disk revolves with the arm but does not rotate in relation to the ground whereby said opening is held in constant direction; and a plurality of indicating words on the signal arm, all but one of said words being hidden by said disk, in each of its signaling positions, and the exposed word being viewed through the opening in said disk.

OSWALD J. ANDERSON.